(12) United States Patent
Kuriyama

(10) Patent No.: US 7,882,891 B2
(45) Date of Patent: Feb. 8, 2011

(54) PRECISION SURFACE PLATE

(75) Inventor: Yutaka Kuriyama, Charlotte, NC (US)

(73) Assignee: Mitutoyo Corporation, Kawasaki-shi (JP)

( * ) Notice: Subject to any disclaimer, the term of this patent is extended or adjusted under 35 U.S.C. 154(b) by 1227 days.

(21) Appl. No.: 11/382,395

(22) Filed: May 9, 2006

(65) Prior Publication Data
US 2006/0257621 A1  Nov. 16, 2006

(30) Foreign Application Priority Data
May 11, 2005  (JP) ............................. 2005-138892

(51) Int. Cl.
*F28F 27/00* (2006.01)
(52) U.S. Cl. .................. 165/276; 165/278; 165/47; 165/96; 454/258; 428/166
(58) Field of Classification Search ................ 428/116; 165/276, 278, 47, 96; 454/258; 52/793.1; 244/53 B
See application file for complete search history.

(56) References Cited

U.S. PATENT DOCUMENTS

| | | | |
|---|---|---|---|
| 3,523,858 A * | 8/1970 | Schudel ................. | 52/793.1 |
| 3,821,999 A * | 7/1974 | Guess et al. ............ | 181/296 |
| 3,895,152 A | 7/1975 | Carlson et al. | |
| 3,910,374 A * | 10/1975 | Holehouse .............. | 428/116 |
| 3,948,346 A * | 4/1976 | Schindler ............... | 428/116 |
| 4,001,473 A * | 1/1977 | Cook ..................... | 428/116 |
| 4,625,710 A * | 12/1986 | Harada et al. ........... | 126/619 |
| 4,963,217 A | 10/1990 | Pavone | |
| 5,180,619 A * | 1/1993 | Landi et al. ............. | 52/793.1 |
| 5,192,623 A * | 3/1993 | Gewelber ............... | 52/791.1 |
| 5,402,734 A * | 4/1995 | Galpin et al. ........... | 428/116 |
| 5,543,198 A * | 8/1996 | Wilson .................. | 428/116 |
| 5,743,488 A * | 4/1998 | Rolston et al. .......... | 244/53 B |
| 5,923,003 A * | 7/1999 | Arcas et al. ............. | 181/292 |
| 6,135,238 A * | 10/2000 | Arcas et al. ............. | 181/292 |
| 6,182,787 B1 * | 2/2001 | Kraft et al. ............. | 181/292 |
| 2003/0157883 A1 * | 8/2003 | Kwak .................... | 454/258 |
| 2004/0126537 A1 | 7/2004 | Jackson et al. | |

FOREIGN PATENT DOCUMENTS

| | | |
|---|---|---|
| DE | 29610952 | 9/1996 |
| JP | 06-331870 | 12/1994 |
| JP | 06331870 | 12/1994 |
| JP | HEI-7-28901 | 7/1995 |

\* cited by examiner

*Primary Examiner*—Ljiljana (Lil) V Ciric
(74) *Attorney, Agent, or Firm*—Rankin, Hill & Clark LLP

(57) ABSTRACT

A precision surface plate has a hollow casing with a reference plane used as a surface on which either or both of a workpiece and mechanical equipment are placed, a honeycomb structure, which is a collection of substantially identically-shaped enclosed cells disposed inside the casing, and a heat transfer device provided in the honeycomb structure to allow cells of the honeycomb structure to communicate with each other and transfer heat. The precision surface plate further includes casing ventilation openings provided in a wall of the casing to allow cells of the honeycomb structure inside the casing to communicate with the outside of the casing, and a shutter for opening and closing the casing ventilation openings. The heat is transferred effectively between the cells of the honeycomb structure through the heat transfer device.

6 Claims, 9 Drawing Sheets

PRECISION SURFACE PLATE

RELATED APPLICATIONS

This application claims priority to the Japanese Patent Application 2005-138892 dated on May 11, 2005 and is hereby incorporated with reference for all purposes.

BACKGROUND OF THE INVENTION

1. Field of the Invention

The present invention relates to precision surface plates, and more specifically to a precision surface plate supporting variable-temperature operation.

2. Prior Art

Conventional surface plates have a reference plane with an appropriately finished smooth surface, on which a workpiece is machined and measured. When a workpiece is machined, the workpiece, a table, and a processing machine are placed on the surface plate. When a workpiece is measured, the workpiece, a table, and a measuring apparatus are placed on the surface plate.

The normal requirements for these surface plates include lightweight, high specific rigidity, and high temperature stability. A variety of surface plates have been developed to meet those requirements, such as a surface plate for optics, using a carbon-fiber-reinforced composite material formed by the impregnation of carbon fibers with a resin (Japanese Unexamined Patent Application Publication No. Hei-6-331870). This surface plate for optics has achieved high rigidity by using a honeycomb material bonded between two sheets of carbon-fiber-reinforced composite material.

Recent surface plates are required to support variable-temperature operation. Conventional surface plates may meet this requirement as follows, for instance: After the temperature of a whole workshop is changed through the variable-temperature operation controlled by a temperature controller, the temperature characteristics of a workpiece may be measured. After the temperature of the whole workshop is controlled to different temperatures, the temperature characteristics of a checking gauge, such as the linear expansion coefficient, may be obtained by measuring the dimensions of the workpiece at each temperature. If the workshop is not at a reference temperature, the whole workshop is controlled to the reference temperature through variable-temperature operation controlled by the temperature controller, then the workpiece may also be machined or measured.

An important point of the variable-temperature operation is ability to quickly change to a desired temperature. One conventional surface plate meets this requirement by changing the temperature of the surface plate itself, not changing the temperature of the whole workshop. The surface plate includes a high-thermal-conductivity solid metal plate, an electronic cooler provided under the metal plate, a temperature sensor provided inside the metal plate, and a temperature controller for controlling the operation of the electronic cooler in accordance with temperature information from the temperature sensor so that the metal plate is brought to a certain temperature (Japanese Utility Model Registration Application Publication No. Hei-7-38901).

The conventional surface plates described above, however, may not provide satisfactory workpiece machining precision or measurement precision in variable-temperature operation.

The conventional surface plates require an electronic cooler and a temperature sensor for temperature control, and such a complicated configuration can surely be improved.

Accordingly, in addition to lightweight, high specific rigidity, and high temperature stability, a simple configuration ensuring support for variable-temperature operation has recently become an important requirement of surface plates.

SUMMARY OF THE INVENTION

In view of the above-described problems in the conventional technology, an object of the present invention is to provide a precision surface plate which has a simple configuration and supports variable-temperature operation appropriately.

Through extensive research to realize this object, the inventor has found that a surface plate which has a simple configuration and which supports variable-temperature operation appropriately must support both variable-temperature operation and constant-temperature operation.

In variable-temperature operation in a workshop, the precision surface plate must be quickly brought to a desired temperature. After the desired temperature is obtained, the precision surface plate must have high temperature stability.

With the conventional technology, it has been difficult for one surface plate to meet these contradictory requirements.

The inventor has realized a surface plate implementing these contradictory requirements and consequently found that a combination of a honeycomb structure and a heat transfer device between honeycomb cells is the optimum solution to realize the present invention.

The honeycomb structure can be used to provide high rigidity also in the conventional surface plates.

A honeycomb surface plate 10 containing a honeycomb structure 12, as shown in FIG. 7, has lightweight and high specific rigidity. The honeycomb surface plate 10 provides a wide range of selectable plate dimensions and components can be disposed thereon with a high degree of flexibility, allowing a wide variety of optical setup to be constructed for various applications from laboratory use to practical use.

The inventor, however, has noted the following point concerning the honeycomb surface plate 10.

In the honeycomb surface plate 10, a large number of enclosed internal honeycomb cells trap air, resulting in the advantages of high heat insulation and high temperature stability.

The honeycomb surface plate 10, however, does not allow air to move between honeycomb cells, as shown in FIG. 8. An internal honeycomb wall 14 of the honeycomb surface plate 10 blocks the transfer of air 18 between cells 16. Because most of the heat exchange between the cells 16 is heat conduction through the honeycomb wall 14, it takes a long time until the temperature of the whole honeycomb surface plate 10 soaks equilibrium with the ambient temperature (that is, the structure has a large thermal time constant).

If it is necessary to change the temperature of an apparatus on a surface plate, it takes long to process or measure because its temperature is changed not quickly. When the ambient temperature drops, as shown in FIG. 9A, the temperature of the mechanical equipment on the surface plate changes more slowly than the room temperature, as shown in FIG. 9B.

A spatial temperature gradient tends to occur inside the honeycomb surface plate 10, and it is therefore difficult to keep the plate surface flat. If optical components are used on the honeycomb surface plate 10, optical misalignments due to the thermal deformation of the surface plate may occur, which is a serious problem for precision applications.

Through extensive investigation of these problems, the inventor has noted the importance of heat transfer through honeycomb cells. The inventor realized the present invention by finding that the temperature of the surface plate can be changed quickly by using a simple combination of a honeycomb structure, and a heat transfer device, such as ventilation openings and/or a highly heat-conductive element, because this structure allows heat to be transferred between honeycomb cells, and that the temperature of the entire surface plate of this type can be changed more evenly than the conventional surface plate provided with a cooler.

In order to achieve the object described above, a precision surface plate of the present invention includes a hollow casing, a honeycomb structure, and a heat transfer device, and the heat transfer device effectively transfers heat between the cells of the honeycomb structure.

Either or both of a workpiece and mechanical equipment are placed on a reference plane of the casing.

The honeycomb structure is a collection of almost identically-shaped enclosed cells provided inside the casing.

The heat transfer device is provided in the honeycomb structure in such a manner that the cells of the honeycomb structure communicate with each other and that heat is transferred between the cells.

In general, cells in a honeycomb structure are completely enclosed. The "enclosed cell" here refers also to a cell having honeycomb ventilation openings in its honeycomb wall as a heat transfer device. Cells having honeycomb ventilation openings in their wall are not completely enclosed, but a honeycomb structure including those cells provides sufficient temperature stability in constant-temperature operation.

The "almost identically-shaped" here means that the enclosed cells have the same shape or almost the same shape.

The heat transfer device in the present invention may include honeycomb ventilation openings provided in a honeycomb wall. It is preferable in the present invention that air moves through the ventilation openings between the cells in the honeycomb structure.

The heat transfer device in the present invention may also include a highly heat-conductive element penetrating the honeycomb wall to allow the cells of the honeycomb structure to communicate with each other. It is preferable in the present invention that heat move between the cells of the honeycomb structure through the highly heat-conductive element.

In the present invention, casing ventilation openings may be provided in a wall of the casing to allow a cell of the honeycomb structure in the casing to communicate with the outside. It is preferable in the present invention that air moves in and out through the casing ventilation openings.

It is also preferable in the present invention that a shutter be provided, the shutter being open when the ambient temperature varies and being closed after it has stopped changing.

The shutter closes or opens the casing openings.

It is preferable in the present invention that a forced ventilator be provided.

The forced ventilator is disposed to communicate with the casing ventilation openings and provides forced ventilation inside and outside the casing.

"Forced ventilation" here means either or both of forced transfer and circulation of air.

<Effect>

Since a precision surface plate of the present invention includes a combination of a honeycomb structure and a heat transfer device, it has a simple configuration that supports variable-temperature operation in the ambient environment.

In the present invention, when the heat transfer device includes either or both of the ventilation openings and the highly heat-conductive element, the temperature of the surface plate can be changed to a desired temperature more effectively.

In the present invention, additional casing ventilation openings allows the temperature of the surface plate to be changed to a desired temperature more effectively.

In the present invention, an additional shutter ensures higher temperature stability after the surface plate is brought to a desired temperature, so that variable-temperature operation in the ambient environment can be supported with higher reliability.

In the present invention, an additional forced ventilator allows the temperature of the surface plate to be brought to a desired temperature in short time.

DESCRIPTION OF THE PREFERRED EMBODIMENTS

Embodiments of the present invention will be described with reference to the drawings.

First Embodiment

Ventilation Openings

Figure 1A:
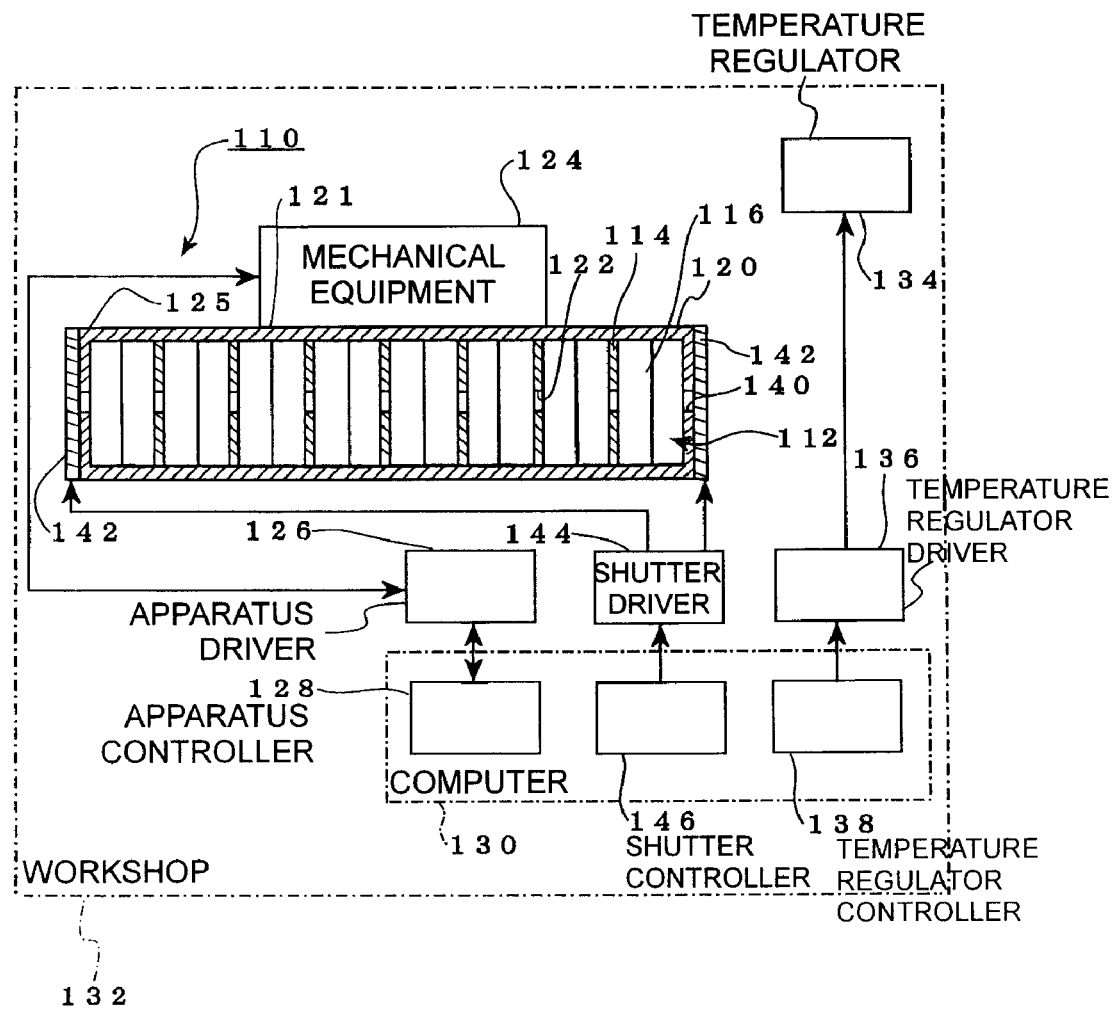
FIGS. 1A and 1B are views showing an outline configuration of a honeycomb surface plate of a first embodiment of the present invention.
Figure 1B:
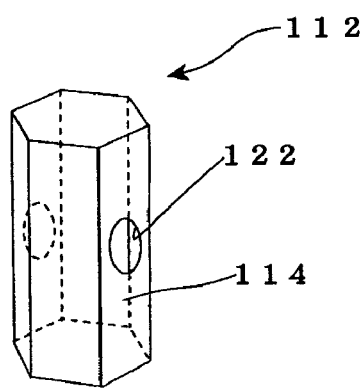

FIGS. 1A and 1B show an outline configuration of a precision surface plate of a first embodiment of the present invention.

Figure 7:
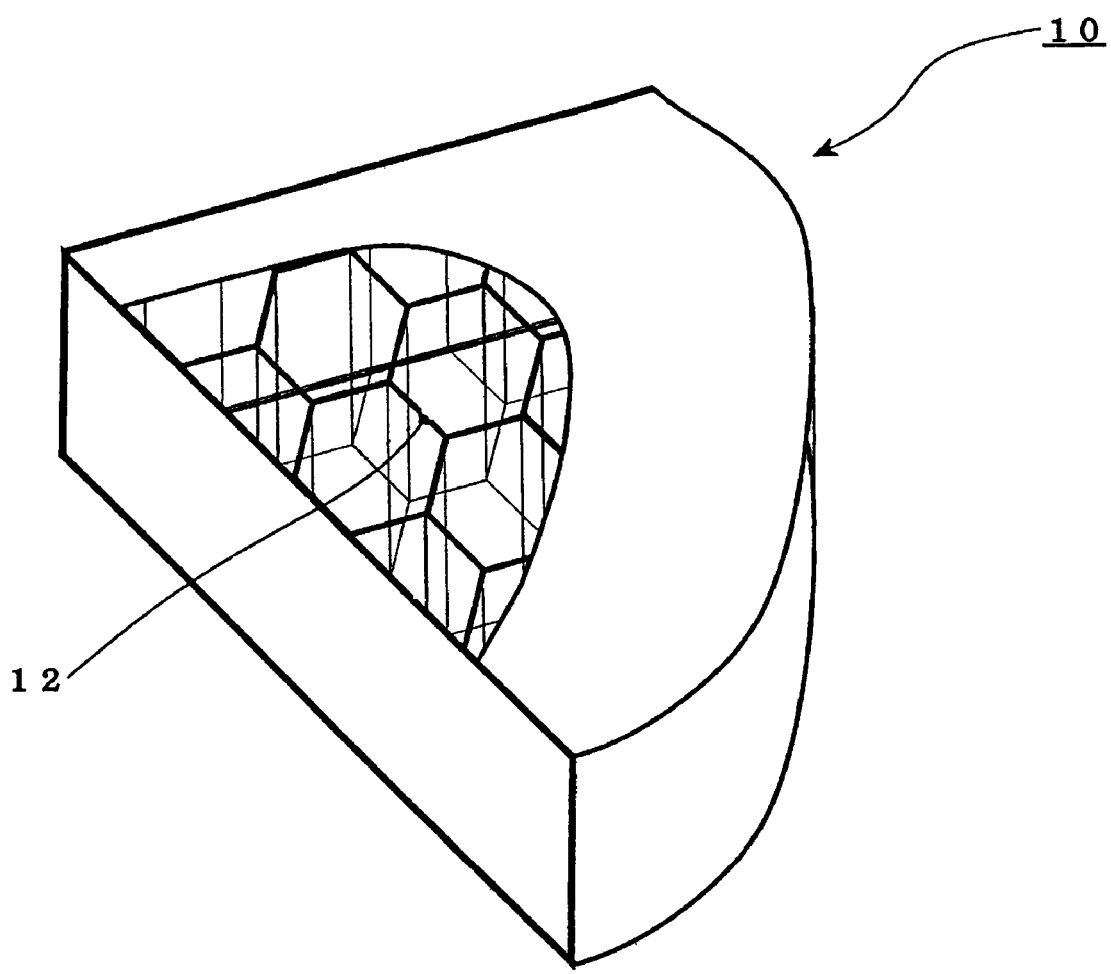
FIG. 7 is a view showing a standard honeycomb surface plate.
Figure 8:
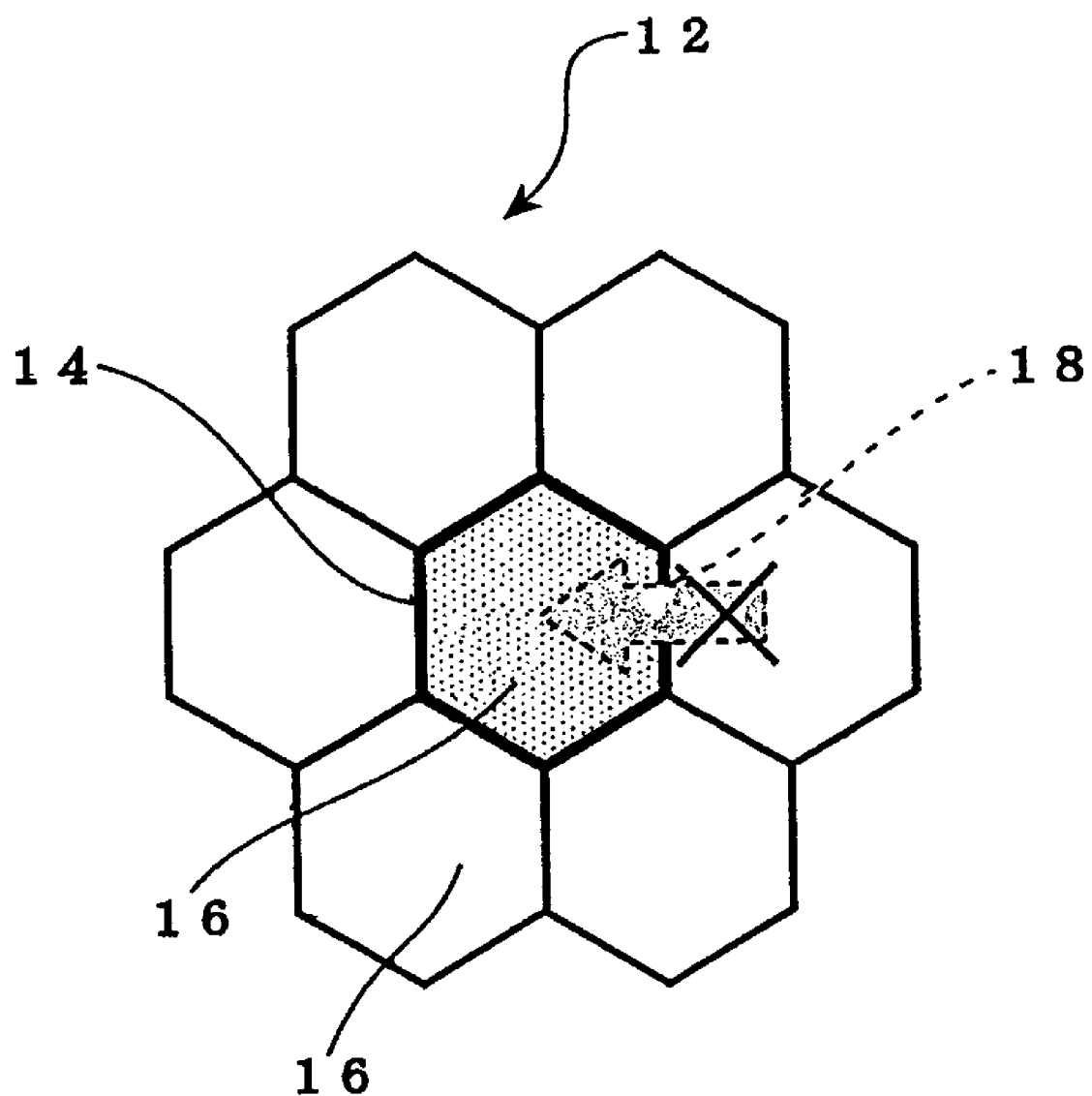
FIG. 8 is a view illustrating a problem of the standard honeycomb surface plate, namely, air trapped in the cells.
Figure 9A:
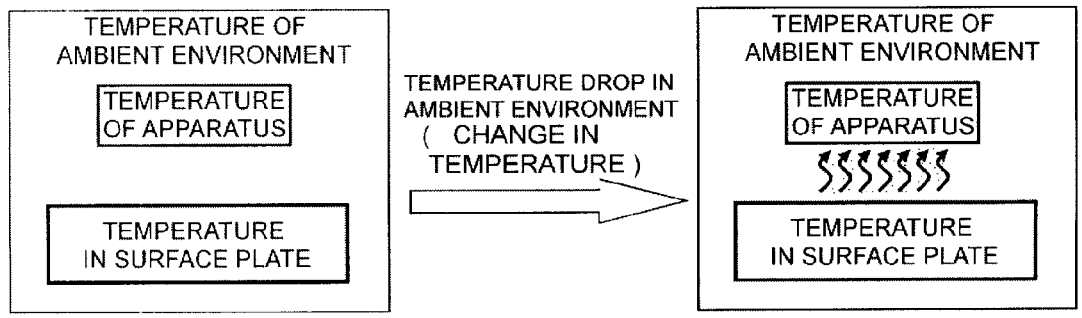
FIGS. 9A and 9B are views illustrating another problem of the standard honeycomb surface plate, namely, a slow temperature change.
Figure 9B:
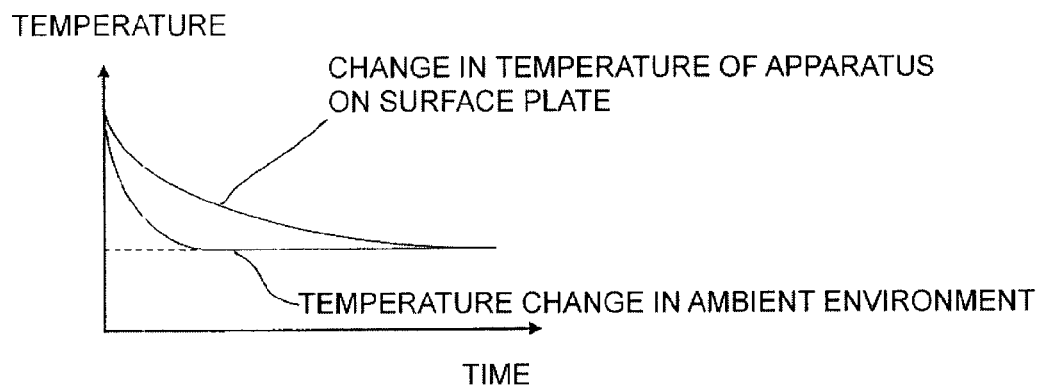

FIG. 1A is a general block diagram, and FIG. 1B is a partially magnified view of a honeycomb structure. Elements corresponding to the elements shown in FIGS. 7 to 9 are denoted by the corresponding reference numerals plus 100.

As shown in the figures, a honeycomb surface plate (precision surface plate) 110 includes a hollow casing 120, a honeycomb structure 112, and a heat transfer device 122.

The reference plane of the hollow casing 120 is a placing surface 121 on which mechanical equipment 124 is placed.

The honeycomb structure 112 is a collection (aggregation/group) of almost identically-shaped, substantially enclosed cells 116 provided inside the casing 120.

The heat transfer device 122 is provided in the honeycomb structure 112 to allow the cells 116 of the honeycomb structure 112 to communicate with each other and allow heat transfer between the cells 116.

In the first embodiment, the heat transfer device 122 includes honeycomb ventilation openings provided in a honeycomb wall 114 (hereafter referred to as honeycomb ventilation openings 122). Air moves through the honeycomb ventilation openings 122 between the cells 116 of the honeycomb structure 112.

The honeycomb surface plate 110 of the first embodiment of the present invention, configured as described above, can appropriately support both variable-temperature operation and constant-temperature operation.

The honeycomb surface plate 110 of the first embodiment and the mechanical equipment 124 are placed in a workshop 132.

The mechanical equipment 124 is, for instance, a length-measuring apparatus disclosed in Japanese Unexamined Patent Application Publication No. 2003-194523.

In the first embodiment, an apparatus driver 126 and a computer 130 including an apparatus controller 128 are also provided.

The workshop 132 has a temperature regulator 134, a temperature-regulator driver 36, and a temperature-regulator controller 138 provided in the computer 130.

In the first embodiment, the temperature regulator 134 controls variable-temperature operation in the ambient environment and changes the temperature of the honeycomb surface plate 110 to a desired temperature by bringing the surrounding environment in the workshop 132 to a corresponding temperature. After the honeycomb surface plate 110 is brought to the desired temperature, the temperature regulator 134 controls constant-temperature operation in the surrounding environment and keeps the constant temperature in the workshop 132.

In the first embodiment, casing ventilation openings 140a and 140b are provided in the wall of the casing 120 to allow the cells 116 of the honeycomb structure 112 in the hollow casing 120 to communicate with the outside of the hollow casing 120. Air moves in and out the casing 120 through the casing ventilation openings 140a and 140b.

In the first embodiment, a shutter 142, a shutter driver 144, and a shutter controller 146 included in the computer 130 are provided.

The shutter 142 closes or opens the casing ventilation openings 140a and 140b.

The shutter driver 144 drives the shutter 142.

The shutter controller 146 controls the operation of the shutter 142 through the shutter driver 144. In variable-temperature operation by the temperature regulator 134, the shutter controller 146 opens the shutter 142 through the shutter driver 144. In constant-temperature operation by the temperature regulator 134, the shutter controller 146 closes the shutter 142 through the shutter driver 144.

The honeycomb surface plate 110 of the first embodiment, configured as described above, has a simple structure, maintains the conventional advantages of the honeycomb surface plate 110, and can prevent the throughput and precision of the mechanical equipment 124 from being degraded significantly in variable-temperature operation.

Because the honeycomb surface plate 110 has the honeycomb ventilation openings 122, air moves through the ventilation openings 122 between the cells 116 of the honeycomb structure 112.

Since the honeycomb surface plate 110 has the casing ventilation openings 140a and 140b as well, surrounding air moves between the cells 116 of the honeycomb structure 112 through the casing ventilation openings 140a and 140b and the honeycomb ventilation openings 122 in variable-temperature operation in ambient environment. Accordingly, air inside the honeycomb surface plate 110 can be quickly replaced by ambient air. The temperature of the whole honeycomb surface plate 110 is evenly and swiftly brought to a desired temperature based on the temperature of the ambient air.

Through the effective heat transfer between the cells 116 of the honeycomb structure 112 by means of the honeycomb ventilation openings 122 and the casing ventilation openings 140a and 140b, the honeycomb surface plate 110 improves the ease with which the temperature of the mechanical equipment 124 on the honeycomb surface plate 110 can be brought into equilibrium with the ambient temperature.

After the honeycomb surface plate 110 is brought to the desired temperature, the temperature of the whole honeycomb surface plate 10 is evenly kept at the temperature of the ambient environment during constant-temperature operation.

The conventional honeycomb surface plate meets the requirements of lightweight, high rigidity, and high temperature stability. Because of its high temperature stability, it is difficult to bring the temperature of the conventional honeycomb surface plate into equilibrium with the ambient temperature during variable-temperature operation.

The honeycomb surface plate of the present invention prevents the throughput, temperature distribution, and precision from being degraded in variable-temperature operation with the simplest possible configuration, while keeping the advantages of the conventional honeycomb surface plate, namely, the lightweight, high rigidity, and high temperature stability.

In the first embodiment, the combination of the honeycomb structure and the ventilation openings realizes lightweight, high rigidity, high temperature stability, and appropriate adaptability to variable-temperature operation in the ambient environment.

Conventionally, if both variable-temperature operation and constant-temperature operation are performed in the ambient environment, a honeycomb surface plate for variable-temperature operation and a honeycomb surface plate for constant-temperature operation are usually used respectively. It is common knowledge in the field that a honeycomb surface plate using a honeycomb structure can be used in constant-temperature operation in the ambient environment, although in variable-temperature operation in the ambient environment, a solid honeycomb surface plate and a cooler are used instead of the honeycomb structure.

The inventor has found that a single honeycomb surface plate of the present invention, using a combination of the honeycomb structure and the ventilation openings, can quickly and evenly change the temperature of the entire structure to a desired temperature based on ambient air in variable-temperature operation and can also keep the desired temperature in constant-temperature operation in the ambient environment.

Figure 2A:
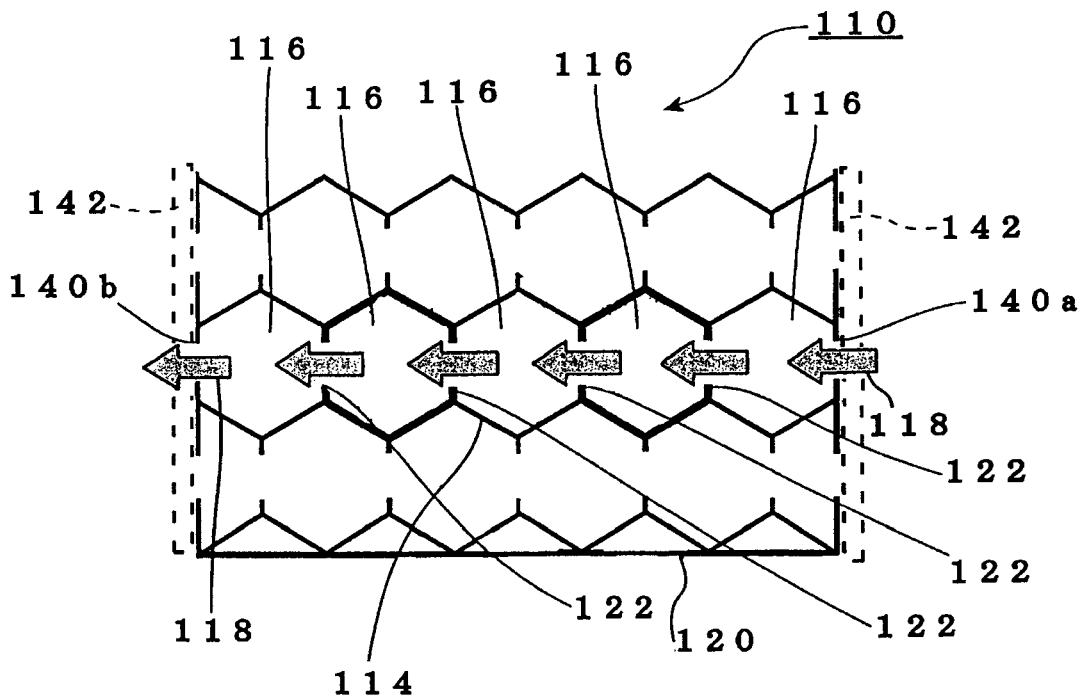
FIGS. 2A and 2B are views showing the effect of the honeycomb surface plate of the first embodiment of the present invention.

In variable-temperature operation in the ambient environment, the shutter 142 opens the casing ventilation openings 140a and 140b, as shown in FIG. 2A. This allows the surrounding air in the workshop to enter the honeycomb surface plate 110 through the casing ventilation opening 140a. That is, air enters the cells 116 of the honeycomb structure in the casing, passes through the cells 116, and moves out of the honeycomb surface plate 110 through the casing ventilation opening 140b.

In the first embodiment, with the flow of the surrounding air through the cells 116 of the honeycomb structure, the temperature of the whole honeycomb surface plate 110 can be quickly and evenly brought to a desired temperature based on the temperature of the surrounding air. In the first embodiment, ease of changing temperature takes precedence over temperature stability of the honeycomb surface plate 110 in variable-temperature operation in the ambient environment.

Figure 2B:
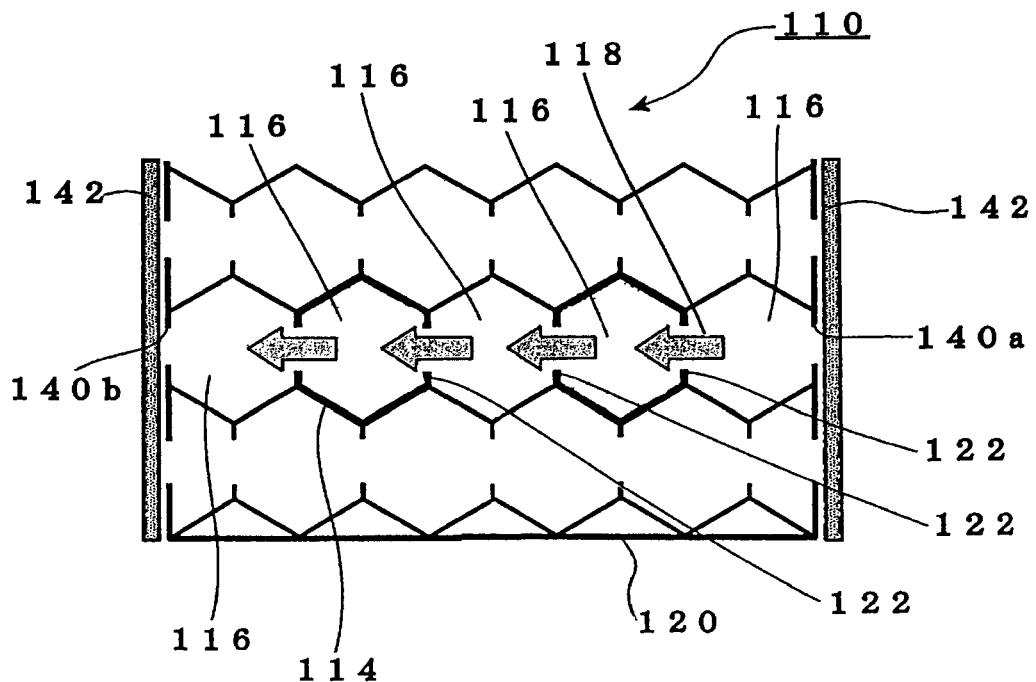

In the first embodiment, in constant-temperature operation in the ambient environment, after the temperature of the honeycomb surface plate 110 is changed to the desired temperature, the shutter 142 closes the casing ventilation openings 140a and 140b, as shown in FIG. 2B. As a result, the large number of enclosed cells 116 in the honeycomb surface plate 110 of the first embodiment trap air of the desired temperature, improving heat insulation and temperature stability at the desired temperature of the honeycomb surface plate 110. In the first embodiment, temperature stability takes precedence over ease of changing the temperature of the honeycomb surface plate 110 in constant-temperature operation.

As has been described above, the temperature of the honeycomb surface plate of the first embodiment can be brought into equilibrium with the ambient temperature in a short period of time, even in variable-temperature operation in the ambient environment.

In the first embodiment, spatial (and temporal) temperature variations in the honeycomb surface plate can be kept small even in variable-temperature operation in the ambient environment, suppressing degradation in the flatness of the plate surface.

Therefore, a single honeycomb surface plate 110 of the first embodiment can appropriately support both variable-temperature operation and constant-temperature operation in the ambient environment.

Second Embodiment

Highly Heat-Conductive Element

Figure 3A:
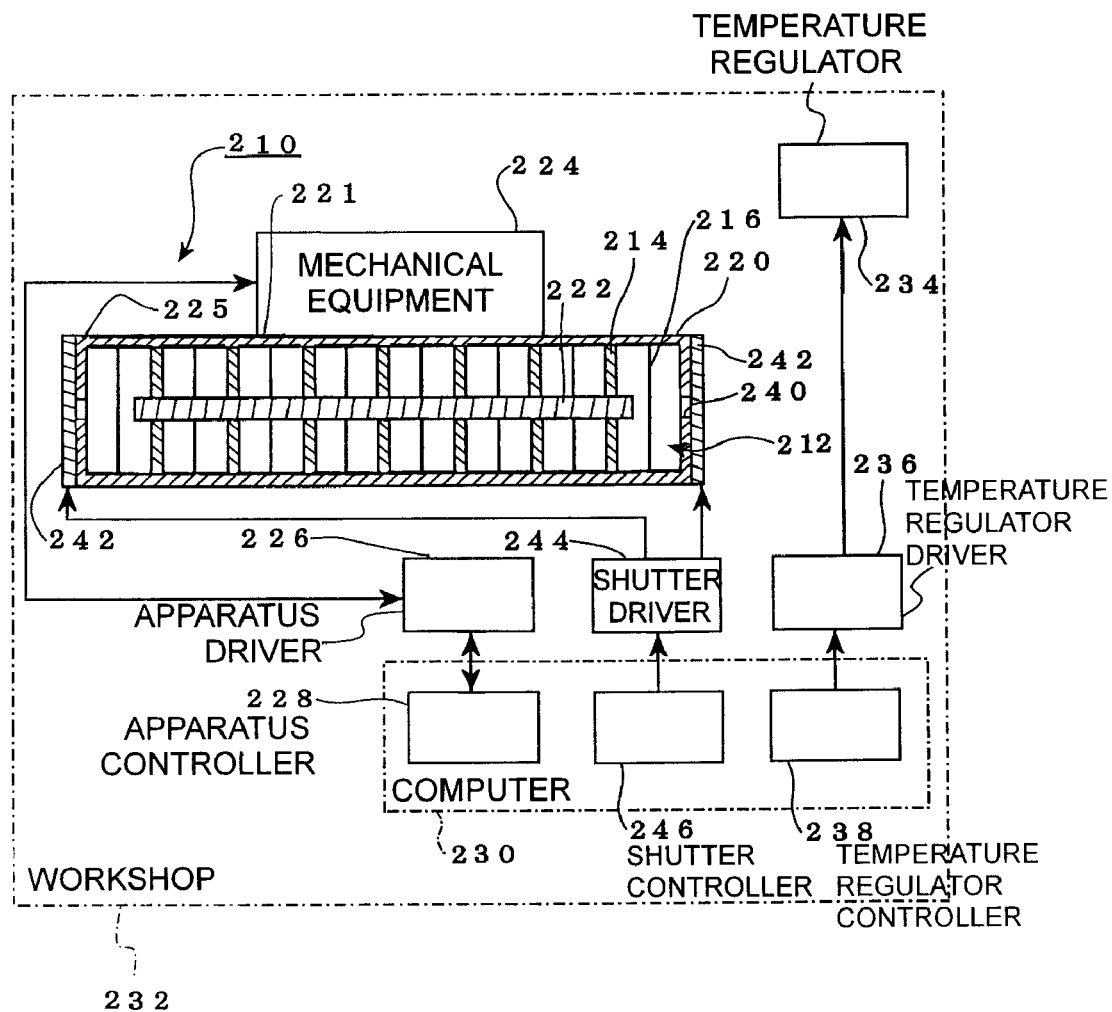
FIGS. 3A and 3B are views showing an outline configuration of a honeycomb surface plate of a second embodiment of the present invention.
Figure 3B:
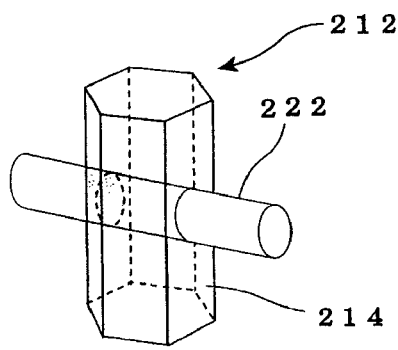

FIGS. 3A and 3B show an outline configuration of a honeycomb surface plate of a second embodiment of the present invention.

FIG. 3A shows a general block diagram, and FIG. 3B shows a partially magnified view of a highly heat-conductive element. Elements corresponding to the elements shown in FIGS. 1A and 1B are denoted by the corresponding reference numerals plus 100.

In the second embodiment, a highly heat-conductive element is used as the heat transfer device, improving the ease with which the temperature of the apparatus on the honeycomb surface plate can be brought into equilibrium with the ambient temperature.

As shown in FIGS. 3A and 3B, a honeycomb surface plate (precision surface plate) 210 uses a highly heat-conductive element as a heat transfer device 222 (hereafter referred to as a highly heat-conductive element 222).

The highly heat-conductive elements 222 penetrate a honeycomb wall 214 to allow cells 216 of a honeycomb structure 212 to communicate with each other and provides high heat conductivity.

With the configuration described above, the temperature of the honeycomb surface plate 210 of the second embodiment of the present invention is quickly changed to a desired temperature based on the temperature of ambient air in variable-temperature operation in the ambient environment, and the temperature stability of the honeycomb surface plate 210 is improved in constant-temperature operation after the temperature stops changing.

In the honeycomb surface plate 210, heat moves between the cells 216 of the honeycomb structure 212 through the highly heat-conductive element 222.

The honeycomb surface plate 210 also has casing ventilation openings 240, through which air moves in and out of a casing 220.

The honeycomb surface plate 210 also has a shutter 242 which opens or closes the casing ventilation openings 240. The shutter 242 opens in variable-temperature operation and closes after the temperature stops changing.

In variable-temperature operation, heat moves between the cells 216 of the honeycomb structure 212 through the highly heat-conductive elements 222.

Figure 4A:
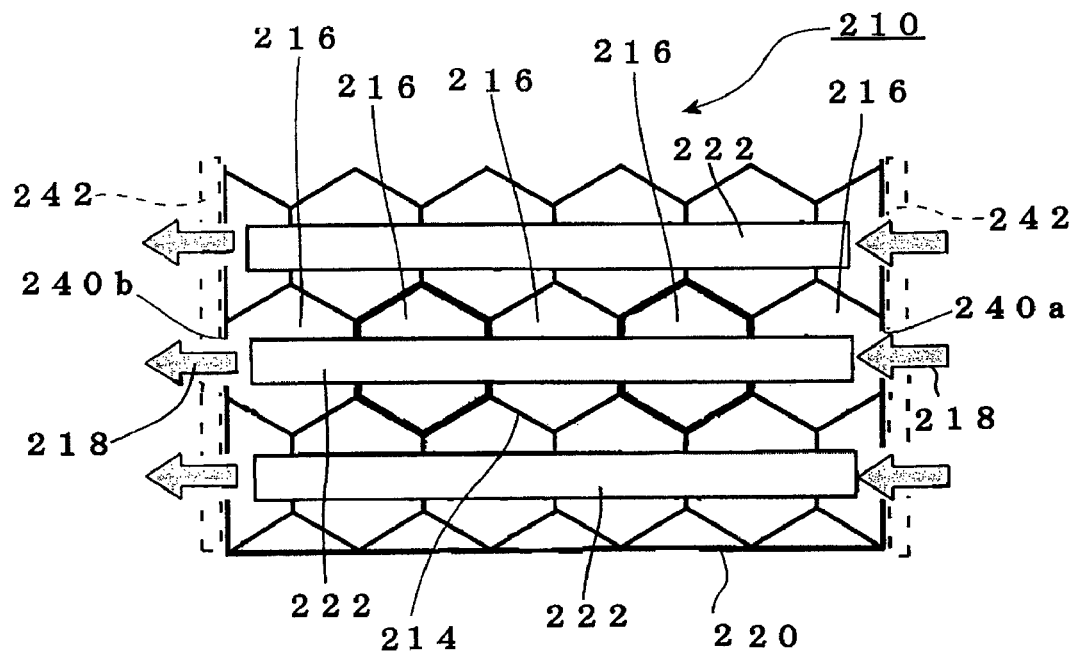
FIGS. 4A and 4B are views showing the effect of the honeycomb surface plate of the second embodiment of the present invention.

In variable-temperature operation, the shutter 242 of the honeycomb surface plate 210 opens, as shown in FIG. 4A, so that air in the cells 216 facing the casing ventilation openings 240 is smoothly mixed with the surrounding air. Because air is smoothly mixed inside and outside the honeycomb surface plate 210 through the highly heat-conductive element 222 and the casing ventilation openings 240, the temperature of the whole honeycomb surface plate 210 can be quickly and evenly brought into equilibrium with the temperature of ambient air.

Figure 4B:
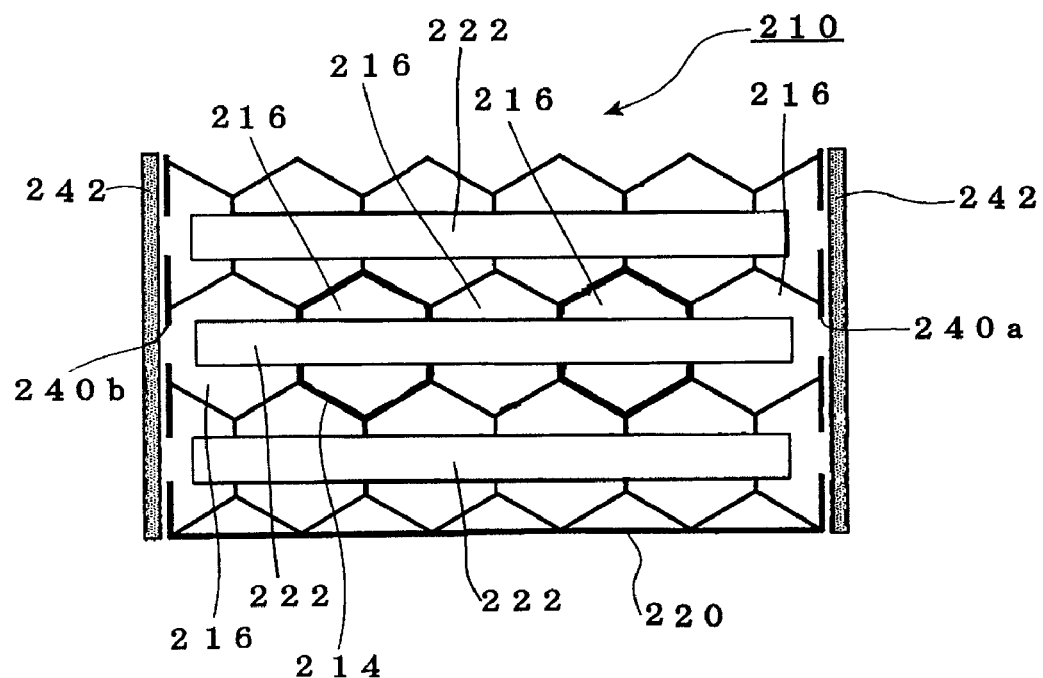

After the honeycomb surface plate 210 is brought to the desired temperature, the shutter 242 is closed, as shown in FIG. 4B, to improve temperature stability of the honeycomb surface plate 210 in constant-temperature operation.

The temperature of the honeycomb surface plate 210 of the second embodiment can be quickly brought into equilibrium with ambient temperature even in variable-temperature operation in the ambient environment, as in the first embodiment.

The temperature variations in the honeycomb surface plate 210 of the second embodiment can be reduced, as in the first embodiment. Consequently, degradation in flatness of the plate surface can be suppressed, as in the first embodiment.

Therefore, the single honeycomb surface plate 210 of the second embodiment including simple elements, that is, the highly heat-conductive elements 222, can appropriately support both variable-temperature operation and constant-temperature operation in the ambient environment.

In the first and second embodiments, it is very important to also provide an air transfer device, which will be described below, for properly varying the temperature of the honeycomb surface plate in variable-temperature operation (for quickly soaking the temperature of the honeycomb surface plate in response to the temperature changes in the ambient environment surrounding the honeycomb surface plate by the variable-temperature operation).

Third Embodiment

Ventilating Fan

Figure 5:
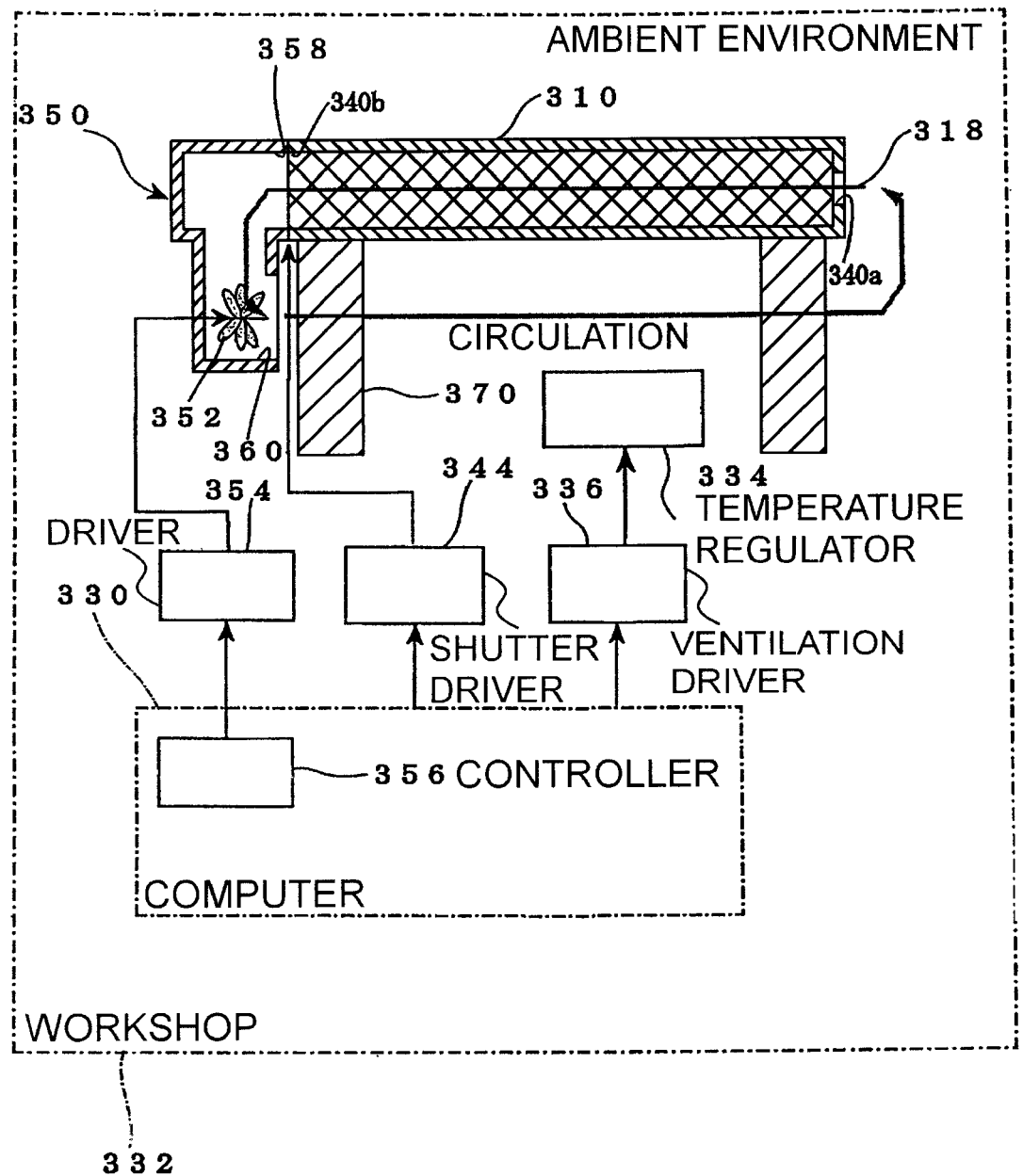
FIG. 5 is a view showing an outline configuration of a honeycomb surface plate of a third embodiment of the present invention.

FIG. 5 shows an outline configuration of a honeycomb surface plate of a third embodiment of the present invention. Elements corresponding to the elements of the first embodiment are denoted by the corresponding reference numerals plus 200. Elements corresponding to the elements of the second embodiment are denoted by the corresponding reference numerals plus 100.

The honeycomb surface plate of the third embodiment differs from the honeycomb surface plates shown in FIGS. 1A, 1B, 2A, and 2B in that a forced ventilator is provided to promote heat transfer.

A honeycomb surface plate 310 shown in FIG. 5 has a ventilating pipe 350, a ventilating fan 352, a ventilation driver 354, and a ventilation controller 356, together serving as a forced ventilator for promoting heat transfer.

The ventilating pipe 350 has an air inlet 358 communicating with a ventilation opening 340b of the honeycomb surface plate 310, and an air outlet 360.

The ventilating fan 352 is disposed in the ventilating pipe 350, near the air outlet 360, to circulate ambient air through the honeycomb surface plate 310.

The ventilation driver 354 drives the ventilating fan 352.

The ventilation controller 356 controls the operation of the ventilating fan 352 through the ventilation driver 354.

The honeycomb surface plate 310 is supported on a vibration-isolating table 370.

The honeycomb surface plate 310 configured as described above, or a combination of the honeycomb surface plate 310 and the forced ventilator, including the ventilating fan 352, promotes heat transfer further.

The ventilating fan 352 of the honeycomb surface plate 310 forces the surrounding air in a workshop 332 into the honeycomb surface plate 310 through a ventilation opening 340a of the honeycomb surface plate 310 and forces the air to pass through the honeycomb surface plate 310 and to exit through the ventilation opening 340b. The ventilating fan 352 brings air exiting from the ventilation opening 340b into the honeycomb surface plate 310 through the ventilation opening 340a again and lets the air pass the honeycomb surface plate 310 and exit through the ventilation opening 340b.

The forced ventilator, including the ventilating fan 352, circulates the surrounding air in the workshop 332 through the honeycomb surface plate 310. In comparison with a honeycomb surface plate using natural air flow, the honeycomb surface plate 310 can replace air inside the honeycomb surface plate 310 with the surrounding air outside of the honeycomb surface plate 310. The honeycomb surface plate 310 can promote heat exchange between the inside and the outside of the honeycomb surface plate 310.

The third embodiment differs from the first and second embodiments in that the ventilating fan is provided as a heat transfer device. In comparison with the first and second embodiments, the third embodiment can bring the honeycomb surface plate 310 to a desired temperature more quickly in variable-temperature operation.

It is also preferable that the air ventilation of the embodiment of the invention is carried out like that: the ventilating fan 352 of the honeycomb surface plate 310 exits the inside air in the honeycomb surface plate 310 to the outside of the honeycomb surface plate 310 through the ventilation opening 340b, it makes inside of the honeycomb surface plate 310 lower pressure. This gives that the air ventilation of the embodiment of the invention uses difference in pressure between the inside and the outside of the honeycomb surface plate 310 to draw outside air (the surrounding air in the workshop 332) of the honeycomb surface plate 310 into the honeycomb surface plate 310 through the ventilation opening 340a naturally.

Fourth Embodiment

Vacuum Ejector

Figure 6:
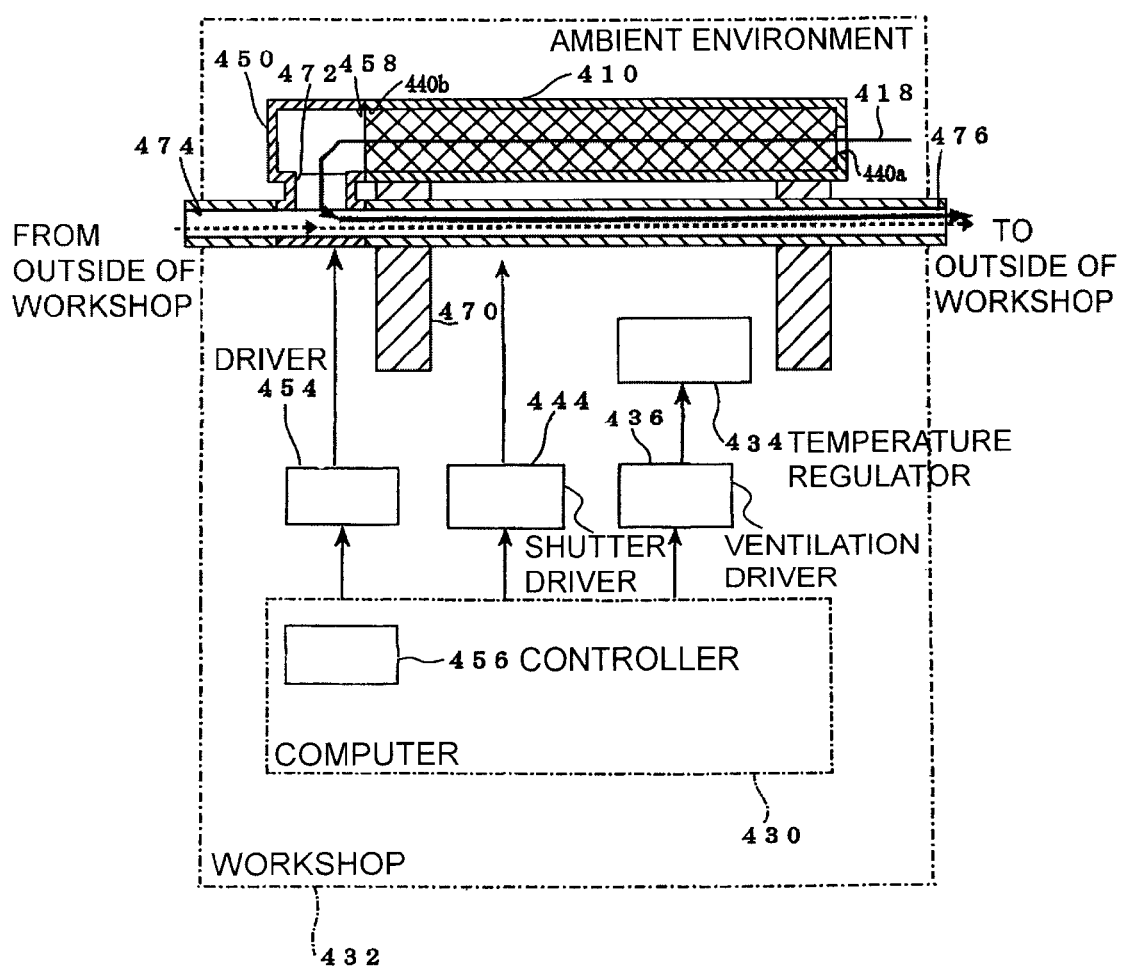
FIG. 6 is a view showing an outline configuration of a honeycomb surface plate of a fourth embodiment of the present invention.

FIG. 6 shows an outline configuration of a honeycomb surface plate of a fourth embodiment of the present invention.

Elements corresponding to the elements of the first embodiment are denoted by the corresponding reference numerals plus 300. Elements corresponding to the elements of the second embodiment are denoted by the corresponding reference numerals plus 200. Elements corresponding to the elements of the third embodiment are denoted by the corresponding reference numerals plus 100.

The honeycomb surface plate of the fourth embodiment differs from the honeycomb surface plates shown in FIGS. 1A, 1B, 2A, and 2B in that a forced ventilator is provided to further promote heat exchange in and out the honeycomb surface plate.

As shown in FIG. 6, a honeycomb surface plate 410 has a ventilating pipe 450, a vacuum ejector (ventilating mechanism) 452, a vacuum-ejector driver 454, and a vacuum-ejector controller 456, as a forced ventilator.

The ventilating pipe 450 has an air inlet 458, an intermediate opening 472, a room air inlet 474, and a room air outlet 476.

The vacuum ejector (ventilating mechanism) 452 is disposed to face the intermediate opening 472 in the ventilating pipe 450 and draws air.

The vacuum-ejector driver 454 drives the vacuum ejector 452.

The vacuum-ejector controller 456 controls the operation of the vacuum ejector 452 through the vacuum-ejector driver 454.

The honeycomb surface plate 410 configured as described above, that is, a combination of the honeycomb surface plate 410 and the forced ventilator, including the vacuum ejector 452, further promotes heat exchange.

The vacuum ejector 452 draws surrounding air in a workshop 432 into the honeycomb surface plate 410 through a ventilation opening 440a and forces the air out of the honeycomb surface plate 410 through a ventilation opening 440b. Air entering the honeycomb surface plate 410 through the casing ventilation opening 440b is drawn through the intermediate opening 472 into the ventilating pipe 450, mixed with outside air coming through the room air inlet 474 in the ventilating pipe 450, and is exhausted through the room air outlet 476.

The vacuum ejector 452 replaces air inside the honeycomb surface plate 410 with the surrounding air. In comparison with a honeycomb surface plate using natural air flow, the honeycomb surface plate 410 can replace air between the inside and the outside of the honeycomb surface plate 410 in a shorter time. The honeycomb surface plate 410 can further promote heat exchange inside and outside the honeycomb surface plate 410.

The fourth embodiment differs from the first and second embodiments in that the vacuum ejector is additionally provided as a forced ventilator. In comparison with the first and second embodiments, the fourth embodiment enables the honeycomb surface plate 410 to be brought to a desired temperature faster in variable-temperature operation.

In the configurations described above, the vacuum ejector is driven by the driver and the controller. But the vacuum ejector of the invention can also form low vacuum in the honeycomb surface plate only by the flow of high-pressure air taken from outside of the honeycomb surface plate, without the driver and the controller.

<Modifications>

(Apparatus Placed on the Honeycomb Surface Plate)

In the configurations described above, a length-measuring apparatus disclosed in Japanese Unexamined Patent Application Publication No. 2003-194523 is placed on the honeycomb surface plates. Because the simple configuration of the present invention supports both variable-temperature operation and constant-temperature operation, other mechanical equipment, such as a measuring apparatus and a processing machine, can also be used. A honeycomb surface plate of the present invention can be used directly as a base of mechanical equipment (measuring apparatus, or processing machine). A honeycomb surface plate of the present invention can also carry a base on which mechanical equipment is placed.

A workpiece can also be placed on a honeycomb surface plate of the present invention. The workpiece can be directly placed on the honeycomb surface plate of the present invention. The workpiece may also be placed on a table placed on the honeycomb surface plate of the present invention.

(Application to a Vibration-Isolating Table)

The characteristic combination of a honeycomb structure and a heat transfer device of the present invention can also be applied to a vibration-isolating table supporting the honeycomb surface plate.

(Shape of the Honeycomb Structure)

The honeycomb structure described above has hexagonal cells, but the honeycomb structure of the present invention can include cells having a different shape.

(Combination of Ventilation Openings and a Highly Heat-Conductive Element)

As a heat transfer device of the present invention, the ventilation openings of the first embodiment or the highly heat-conductive element of the second embodiment may be used alone, and these different heat transfer devices may be used in combination.

What is claimed is:

1. A precision surface plate comprising:
   a hollow casing having a reference plane used as a surface on which at least one of a workpiece and mechanical equipment are placed;
   a honeycomb structure, formed of collection of substantially identically-shaped enclosed cells, disposed inside the casing; and
   a heat transfer device provided in the honeycomb structure to allow the cells of the honeycomb structure to communicate with each other and transfer heat,
   wherein heat is transferred effectively between the cells of the honeycomb structure through the heat transfer device,
   wherein casing ventilation openings are provided in a wall of the casing to allow cells of the honeycomb structure inside the casing to communicate with the outside of the casing, and air moves in and out the casing through the casing ventilation openings; and
   further comprising a shutter for opening and closing the casing ventilation openings.

2. A precision surface plate according to claim 1, further comprising a forced ventilator disposed to communicate with the casing ventilation openings and to provide forced ventilation inside and outside the casing.

3. The precision surface plate according to claim 1, wherein the shutter is open in variable-temperature operation in the ambient environment, and the shutter is closed in constant-temperature operation after the surface plate is brought to a desired temperature.

4. A precision surface plate comprising:
   a hollow casing having a reference plane used as a surface on which at least one of a workpiece and mechanical equipment are placed;
   a honeycomb structure, formed of collection of substantially identically-shaped enclosed cells, disposed inside the casing;
   a heat transfer device provided in the honeycomb structure to allow the cells of the honeycomb structure to communicate with each other and transfer heat,
   wherein heat is transferred effectively between the cells of the honeycomb structure through the heat transfer device,
   wherein the cells of the honeycomb structure are defined by a plurality of honeycomb walls, and the heat transfer device comprises honeycomb ventilation openings provided in at least one of the plurality of honeycomb walls, and wherein the honeycomb ventilation openings allow the cells of the honeycomb structure to communicate with each other such that air moves between the cells of the honeycomb structure through the honeycomb ventilation openings,
   wherein casing ventilation openings are provided in a wall of the casing to allow cells of the honeycomb structure inside the casing to communicate with the outside of the casing, and air moves in and out the casing through the casing ventilation openings; and
   further comprising a shutter for opening and closing the casing ventilation openings.

5. A precision surface plate according to claim 4, further comprising a forced ventilator disposed to communicate with the casing ventilation openings and to provide forced ventilation inside and outside the casing.

6. The precision surface plate according to claim 4, wherein the shutter is open in variable-temperature operation in the ambient environment, and the shutter is closed in constant-temperature operation after the surface plate is brought to a desired temperature.

* * * * *